March 14, 1950 R. R. RIESZ 2,500,646
VISUAL REPRESENTATION OF COMPLEX WAVES
Filed Nov. 23, 1946 3 Sheets-Sheet 1

INVENTOR
R. R. RIESZ
BY
Robert J. Pluskey
ATTORNEY

U (POOL)

I (BEET)

A (FATHER)

SH

S

F

TH

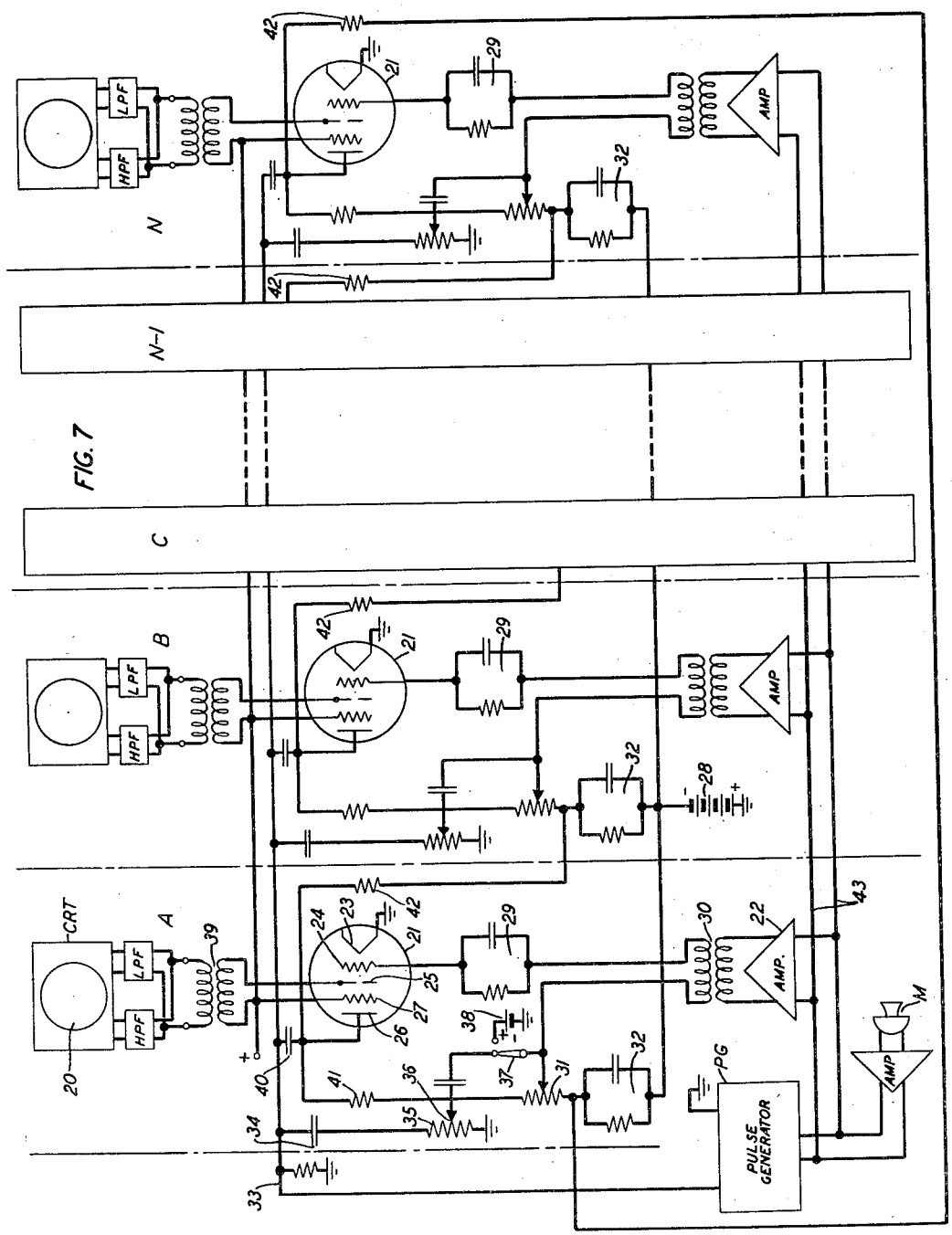

Patented Mar. 14, 1950

2,500,646

UNITED STATES PATENT OFFICE 2,500,646

VISUAL REPRESENTATION OF COMPLEX WAVES

Robert R. Riesz, Chatham, N. J., assignor to Bell Telephone Laboratories, Incorporated, New York, N. Y., a corporation of New York Application November 23, 1946, Serial No. 711,898

17 Claims. (Cl. 179—1)

This invention relates to the analysis and visual representation of a complex wave, and, more particularly, to a method and means for representing a discrete speech sound in an individual or distinctive visual pattern.

An object of the invention is to convert an individual speech sound, or its complex electric wave counterpart, into an individual pictorial representation, symbol or pattern such that it can be recognized by the eye of an appropriately trained person who may be, for example, either the originator of the speech sound, one to whom the speech sound is directed, or a student of speech sounds.

Another object is successively to convert a sequence or series of speech sounds, or their complex electric wave counterparts, into a succession of pictorial representations or patterns each individual or respective to the successive speech sounds in the sequence or series such that, as the speech sounds are generated, or converted, an observer contemporaneously may determine visually the substance or message embodied in the speech sounds.

A feature of the invention comprises visually representing a particular or individual speech sound in terms of the ratio of selected frequencies in the frequency spectrum for the speech sound.

A further feature comprises visually representing a particular or individual speech sound in accordance with the foregoing feature and wherein the selected frequencies are harmonics of the fundamental frequency of the particular speech sound.

Still another feature comprises visually representing a sequence or series of speech sounds or their complex electric wave counterparts by a sequence or series of pictorial representations or patterns, each individual or respective to the successive speech sounds or electric counterparts, substantially simultaneously with the production of the speech sounds or their electrical counterparts.

Other objects and features of the invention will be evident from the detailed description that follows hereinafter, read with reference to the appended drawings, wherein:

Fig. 7 shows a circuit arrangement for visually presenting a sequence of visual patterns corresponding to a sequence of speech sounds;

This invention is concerned with the automatic translation of speech sounds into pictorial or visual representations, patterns or symbols either contemporaneously with their being produced, or from a phonographic, film or other record that has been made of the speech sounds.

With respect to the observer, each visual pattern or symbol should be distinctive of or individual to a conventional speech sound or phonetic unit. A succession of such patterns will convey the word or phrase corresponding to the speech sounds uttered by the speaker. Such an observer, if hard of hearing or deaf, will thereby possess a visual aid to compensate for his inability to hear. On the other hand, the observer may be the student of a language who will be assisted in a further understanding of its phonetic aspects. Obviously, the observer may or will require training in the recognition or reading of the patterns, the time involved varying with the aptitude and zeal of the trainee.

This invention employs, in a novel manner, well recognized properties of speech sounds. Voiced sounds consist of waves of fundamental frequency and its harmonics, the amplitudes of the harmonics in certain frequency regions being greater than those in other frequency regions. In vowel sounds, there are usually at least two frequency regions of high amplitude components, these frequency regions being characteristic for each vowel sound, and more or less independent of the fundamental frequency. In the case of vowel sounds there is at least one such resonance region below approximately 1100 cycles per second, and at least one such resonance region above that reference frequency. These facts enable the construction of an arrangement, for example, a cathode ray tube or oscilloscope circuit, for the production of a characteristic or distinctive pattern for each distinctive speech sound or phonetic unit.

Figure 1:
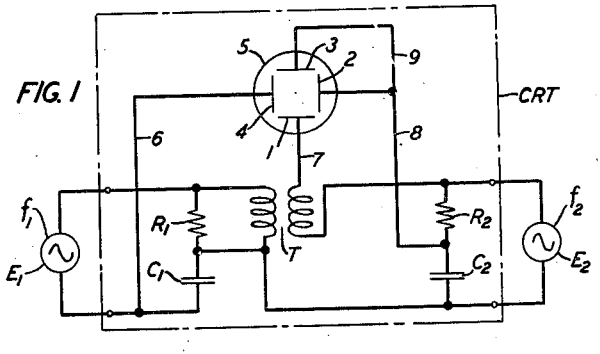
Fig. 1 illustrates a cathode ray tube circuit arrangement embodying the principles of the invention, for producing a visual representation or pattern respective to a plurality of electric waves.

Fig. 1 shows the two pairs, 1, 3 and 2, 4, of horizontal and vertical deflecting plates of a cathode ray tube 5, sources $E_1$, $E_2$ of alternating currents of frequencies $f_1$, $f_2$, respectively, and serially-connected resistance-capacitance networks $R_1$, $C_1$, and $R_2$, $C_2$ across the respective sources $E_1$, $E_2$ interconnecting the sources $E_1$, $E_2$ through transformer T and conductors 6, 7, 8, 9 with the deflecting plates of the tube. The tube 5 may be of any suitable type including a source of the cathode ray or electron beam and a fluorescent screen against which the electron beam is to be directed to provide a luminous spot or trace as the tube is operated. The input from source $E_1$, impressed across the $R_1$, $C_1$ network is divided thereby into two portions or components 90 degrees out of phase, one portion being applied across plates 1, 3 through the transformer T, and the other portion across the plates 2, 4. In similar fashion, the input from source $E_2$ impressed across the $R_2$, $C_2$ network is divided thereby into two portions or components 90 degrees out of phase, one portion being applied across plates 1, 3 through one winding of the transformer T, and the other across the plates 2, 4.

With the circuit arrangement of Fig. 1, the cathode ray or electron beam of the tube will produce a stationary or fixed trace or pattern on the tube's fluorescent screen, whenever the ratio of $f_1$ to $f_2$ is the ratio of integers. If the condensers $C_1$, $C_2$ and resistances $R_1$, $R_2$ are chosen of appropriate values, the trace or pattern produced on the screen by the electron beam under control of either the electric wave $f_1$ or the electric wave $f_2$ alone, will be that of a circle. Illustrative of the visual patterns obtainable with the arrangement of Fig. 1 are those shown by Figs. 2A and 2B. $R_1$ and $R_2$ were 1000 and 3000 ohms, respectively; $C_1$ and $C_2$ were 4 to 1 microfarad, respectively; $f_1$ and $f_2$ were equal to 100 and 400 cycles per second, respectively. The pattern of Fig. 2A was obtained for a condition in which the ratio of the amplitudes of the waves $f_1$, $f_2$ was unity, and the pattern of Fig. 2B for a condition in which the amplitudes of the waves $f_1$, $f_2$ were in the ratio of 1:2.

To understand the operation of the circuit of Fig. 1, consider the pattern observed on the screen of the oscilloscope when the wave $f_1$ is applied alone to the circuit. It was observed that a circular pattern was produced. The vertical and horizontal deflections of the electron beam are given by:

$$x_1 = a \cos 2\pi f_1 t \qquad y_1 = a \sin 2\pi f_1 t \qquad (1)$$

The locus of the spot will then be the circle of radius, $a$:

$$a = \sqrt{x^2_1 + y^2_1} \qquad (2)$$

It can be shown that the beam moves around the circle in a counterclockwise direction, completing a complete trace in the time $$\frac{1}{f_1}$$

When a wave of frequency $f_2 = nf_1$, where $n$ is an integer, is applied alone to the circuit, the electron beam again traces a circular path, and assuming the ratio of amplitudes of $f_1$ and $f_2$ to be unity:

$$x_2 = a \cos 2\pi n f_1 t \qquad y_2 = a \sin 2\pi n f_1 t \qquad (3)$$

The locus of the luminous spot will again be a circle of radius, $a$:

$$a_2 = \sqrt{x^2_2 + y^2_2} \qquad (4)$$

This beam will move around the circle in a counterclockwise direction, completing one trace in the time $$\frac{1}{f_2} = \frac{1}{nf_1}$$

If both waves are applied simultaneously, the resulting deflection of the beam is given by:

$$x = x_1 + x_2 = a(\cos 2\pi f_1 t + \cos 2\pi n f_1 t)$$
$$y = y_1 + y_2 = a(\sin 2\pi f_1 t + \sin 2\pi n f_1 t) \qquad (5)$$

The polar plot of the resulting trace of the luminous spot on the oscilloscope screen can be shown to be:

$$\rho = 2a \cos\left(\frac{n-1}{n+1}\right)\theta \qquad (6)$$

where:

$$\rho = \sqrt{x^2 + y^2}$$

$$\theta = \tan^{-1}\frac{y}{x}$$

The transformer may be poled so that the circular patterns described are traced in opposite directions, that is, one clockwise and the other counterclockwise. In such event:

$$x_1 = a \cos 2\pi f_1 t \qquad y_1 = a \sin 2\pi f_1 t \qquad (7)$$
$$x_2 = a \cos 2\pi n f_1 t \qquad y_2 = -a \sin 2\pi n f_1 t \qquad (8)$$

and the polar plot of the resultant trace is:

$$\rho = 2a \cos\left(\frac{n+1}{n-1}\right)\theta$$

Figure 2A:
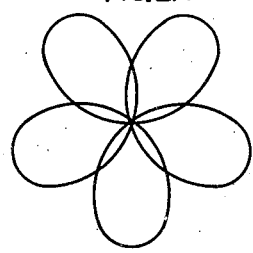
Figs. 2A and 2B illustrate visual patterns obtained in accordance with the invention, for selected frequency and amplitude ratios of particular audio frequency electric waves.
Figure 2B:

The patterns of Fig. 2A and Fig. 2B were obtained for the condition in which the applied wave from one source tended to move the electron beam in a circle in one direction, and the applied wave from the other source tended to move the electron beam in a circle in an opposite direction, the resultant movement of the electron beam resulting in a luminous trace such as is illustrated by the figures. If the transformer poling had been reversed, the patterns obtained would have been distinctively different, and for the same frequency and amplitude ratios, each pattern would evidence three pronounced loop portions. Change in either the frequency ratio, the amplitude ratio or both, from an initial frequency ratio and amplitude ratio, produces a specific or individual different visual pattern on the tube screen, and when the frequencies involved are integrally related, the pattern appears stationary or fixed. When waves of several frequencies, all of which are integrally related, are applied to the two input circuits, the patterns are still stationary but more complex in character.

Figure 3:
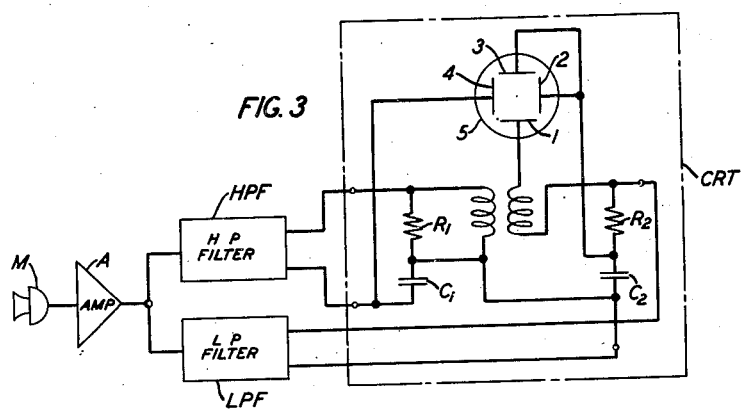
Fig. 3 illustrates a circuit arrangement embodying the principles of the invention for obtaining visual representations or patterns characteristic of or respective to individual speech sounds.

Fig. 3 illustrates, in schematic, a circuit arrangement for producing visible speech in accordance with the principles developed hereinabove. A sound wave energy pick-up device or microphone M is interconnected by an audio frequency amplifier A to the input terminals of a pair of band-pass filters HPF, LPF. These filters may have a common cut-off frequency between the low and the upper frequency resonance regions of the vowel sounds, filter LPF having a pass-band for the frequencies of the lower resonance regions, and the filter HPF having a pass-band for the frequencies of the higher or upper resonance regions. The common cut-off frequency may be of the order of 1100 cycles per second. In operation, the speech sound generated at the microphone is translated by the microphone into audio frequency currents corresponding thereto, suitably amplified by the amplifier A, divided by the filters into component bands respective to the lower and the upper resonance regions of the frequency spectrum for the particular speech sound, and the component frequency bands applied to separate pairs of the deflecting plates of the tube. Since the higher frequency region harmonics applied to one set of input terminals of the cathode ray tube circuit CRT are integrally related to the lower frequency region harmonics applied to the other set of input terminals of the circuit, the resulting visual pattern on the tube screen will be stationary for voiced sounds. The shape and the dimensions of the pattern will be determined by the specific harmonics present in each of the two frequency regions for the specific speech sound or phonetic unit, and their relative amplitudes, resulting in a stationary or fixed pattern respective to each voiced speech sound, and relatively independent of the pitch at which the speech sound is spoken. For unvoiced speech sounds, the visual pattern will not remain fixed or stationary, but the unvoiced speech sound acting on the microphone M will produce on the tube screen a heterogeneous pattern whose shape and dimensions will depend on the energy distribution in the two resonance regions for the particular unvoiced sound, but each such speed sound will produce a respective or individual pattern.

Figure 4A:
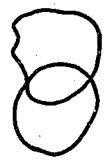
Figs. 4A, 4B and 4C are illustrative of the visual patterns obtainable in accordance with this invention for typical vowel speech sounds.
Figure 4B:
Figure 4C:
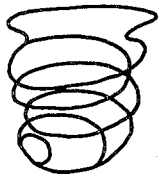
Figure 5A:
Figs. 5A, 5B, 5C and 5D are illustrative of the visual patterns obtainable in accordance with the invention for typical unvoiced speech sounds.
Figure 5B:
Figure 5C:
Figure 5D:

In a specific circuit arrangement, constructed in accordance with the arrangement of Fig. 3, for producing visual patterns based on the above considerations, the filter HPF may have a lower cut-off frequency of approximately 1100 cycles per second; the filter LPF an upper cut-off frequency of approximately 1100 cycles per second; $R_1$, $R_2$ values of 8000 and 1000 ohms, respectively; and $C_1$, $C_2$ values of one (1) and four (4) microfarads, respectively. With such an arrangement, visual patterns distinctive of or respective to specific speed sound were produced on the cathode ray tube screen, using a number of different persons as the sources of the specific speed sound or phonetic unit. Despite differences in the pitches of the various voices, the visual pattern produced by each speaker of the same speech sound was substantially the same. Figs. 4A, 4B and 4C are reproductions of the stationary visual patterns obtained in each case for the indicated $u$, $i$ and $a$ vowel sounds. For unvoiced sounds, a stationary pattern does not appear to be obtainable, but the speech sound can be recognized by the general contour or outline and dimensions of the patterns. Figs. 5A, 5B, 5C and 5D illustrate the contour or shape and the relative dimensions of typical unvoiced speech sounds, for example, sh, s, f and th, obtained in accordance with the invention.

With the single tube arrangement already described, the succession of visual patterns corresponding to a succession of speech sounds actuating the microphone, might be difficult to observe or "read" unless their appearance on the tube screen were slowed down, and/or the disappearance of a preceding pattern from the screen prior to the appearance of a succeeding pattern on the screen were accelerated. One solution for such a problem would be to produce successive speech sound patterns on different but adjacent viewing areas, arranged or disposed, for example, in a row. In this way, the patterns would be displayed or spread out before the observer and could be scanned as one does in reading a written or a printed word, or a sequence of words. An arrangement for accomplishing this is illustrated in Fig. 7.

The arrangement of Fig. 7 comprises a number N of similar visual indicator units A, B, C . . . N, connected in a ring circuit; an electroacoustic transducer or microphone M for translating speech sounds into audio frequency currents corresponding thereto; an audio frequency amplifying means or amplifier AMP; and a pulse generator PG, illustrated in greater detail in Fig. 6, for deriving positive pulses from the amplified currents delivered by the amplifier AMP.

Each visual indicator unit comprises a cathode ray tube and associated network, the tube having a fluorescent screen or viewing area 20, substantially the same as the cathode ray tube and network enclosed within the broken line enclosure CRT of Fig. 1; a vacuum tube triggering and amplifying device 21; and an audio frequency amplifying means or amplifier 22. The device 21 is a vacuum tube of the type disclosed in A. M. Skellett Patent 2,293,177 of August 18, 1942, and comprises a triode section including a cathode 23, control grid 24 and apertured anode 25, and a secondary emission section including a secondary electron source or anode 26 and a collector grid 27.

The cathode is connected to ground potential, and the control grid is connected to the negative terminal of a source 28 of direct current potential through a resistor-capacitor network 29, secondary winding of the output transformer 30 for the amplifier 22, potentiometer 31, and a resistor-capacitor network 32. The control grid is also connected to the input conductor 33 from the pulse generator through the series-connected capacitor 34 and potentiometer 35, contact 36 and switch 37. The control grid may also be connected by means of switch 37 to the positive terminal of a second source 38 of direct current potential. Normally, with the switch 37 in the position indicated in the drawing, and the secondary section of the tube in a deactivated condition, the control grid will be biased negatively beyond primary anode current cut-off. The primary anode and the collector grid are interconnected through the primary winding of transformer 39, these electrodes being connected, as indicated, to the positive terminal of a suitable source of direct current potential. The secondary anode is connected through a capacitor 40 with the input conductor 33 from the pulse generator, through a resistor 41 with the potentiometer 31, and through a second resistor 42 to the junction of the potentiometer and the resistor-capacitor network of the next succeeding indicator unit corresponding to the potentiometer 31 and the resistor-capacitor network 32 of the preceding indicator unit. High and low band-pass filters HPF, LPF, similar to those of Fig. 3, are connected across the secondary winding of transformer 39, their outputs being connected across networks $R_1$, $C_1$ and $R_2$, $C_2$, respectively, of the cathode ray tube and network CRT. The input terminals of amplifier 22 are connected over the path 43 with the output terminals of the amplifier AMP.

As explained in detail in the Skellett patent, the primary electron section of the device 21 may be utilized as an amplifier, detector or oscillator, although in the arrangement of Fig. 7 its capabilities as an amplifying means are employed, and the secondary electron section may be utilized as a means for triggering the primary section on or off, that is, rendering it conducting or non-conducting. The secondary anode has the characteristic, when bombarded with primary electrons, of rising to a relatively high and stable potential, and this change in potential of the secondary anode of the device 21 of one visual indicator unit may be employed to trigger on the primary section of its own device and to establish a priming condition on the control grid of the device 21 of the next succeeding visual indicator unit. With reference to Fig. 7, let it be assumed that the triode section of the device 21 of unit A is non-conducting, i. e., the control grid is biased beyond primary anode current cut-off. Connecting switch 37 to its alternate position applies positive potential from source 38 to grid 24, raising it above primary anode current cut-off. Flow of electrons to the primary anode 25 and to the secondary anode 26 through an aperture in anode 25, causes the anode 26 to emit secondary electrons and to rise in potential. This change in potential is effective on the control grid, through resistor 41 and potentiometer 31, to raise the control grid to a still higher positive potential with reference to the cathode, thereby increasing primary electron flow and accelerating the adjustment of the secondary anode to its upper stable or floating potential. If the switch 37 is then returned to its normal position, as shown in the drawing, the triode section of the device 21 remains conducting so long as the anode 26 remains at its elevated potential. As the anode 26 of the device 21 of the unit A rises to its floating potential, its change in potential will be applied through resistor 42 to the network 32 of the next succeeding visual indicator unit B. The potential developed across the network 32 of unit B compensates in part for the negative bias normally maintaining the triode section of the device 21 of the unit B in a non-conducting condition, but not sufficiently to overcome such negative bias so as to permit any appreciable primary electron flow therein. When a positive pulse is incoming on conductor 33, for example, from the pulse generator PG, its effect on unit A will be as follows: Acting through the capacitor 34 and potentiometer 35, switch 37 and network 29, it will drive the control grid of device 21 sufficiently positive so that it draws current thereby charging up the capacitor of the network 29. Upon cessation of the pulse, discharge of the referenced capacitor through the resistor of network 29 applies sufficient negative potential to the control grid to block primary electron flow in the triode section with resultant deactivation of the secondary section and a non-conducting condition of the triode section. Simultaneously, the incoming positive pulse will be effective on the control grid of each device 21 of the other visual indicator units, that is, B . . . N. Since only the unit next succeeding unit A has been primed, or placed in condition to be triggered-on, only the device 21 of unit B will have its triode section rendered conducting so as to be able to amplify the output of its associated amplifier 22, and its secondary section activated so as to prime the next succeeding visual indicator unit (namely, C) for operation on the next succeeding positive pulse. Successively, therefore, the visual indicator units are primed for operation and operated by the successive incoming pulses, operation of the unit N priming the unit A. As each visual indicator unit is operated, the output of its respective amplifier 22 is applied to the grid-cathode circuit of the triode section of the device 21 to be further amplified in the latter, and applied to the cathode ray tube circuit through the transformer 39 and the filters LPF, HPF.

In accordance with this invention, the positive pulses for successively operating the visual indicator units are derived from the currents corresponding to the speech sounds that are directed against the microphone M, and which currents are simultaneously applied to the amplifier 22 of each indicator unit.

Figure 6:
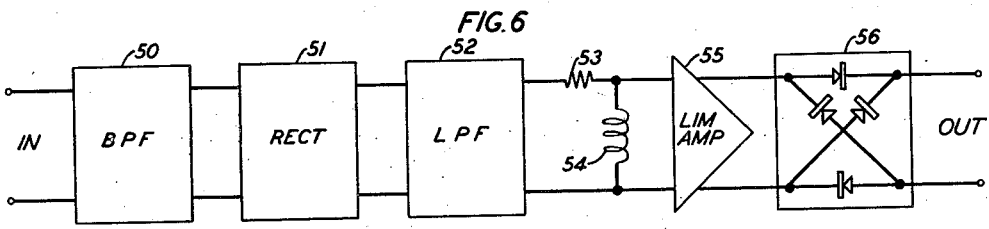
Fig. 6 is a schematic diagram of a pulse generating circuit for deriving a series of positive pulses respective to speech sound wave energy.

The means for deriving the pulses or control signals comprises the pulse generator PG which may take the form illustrated by Fig. 6. It comprises a band-pass filter 50, a full wave rectifier 51, a low-pass filter 52, terminated in resistance 53 and inductance 54 in series, a peak limiting amplifier 55, and a second full wave rectifier 56. The filter 50 preferably has a frequency pass-band in the frequency range in which the speech energy between different speech sounds is the greatest possible. A typical band might be that between 700 and 1200 cycles per second. The speech energy in this band is rectified in the rectifier 51, and the direct current component extracted by means of the filter 52, which may have a cut-off frequency of the order of 60 cycles per second. The output of the filter 52 appears across the resistance 53 and inductance 54. The voltage across the inductance 54 is proportional to $di/dt$, whereby a positive or a negative peak therein is produced when the amplitude of the voltage changes suddenly. The peaks are converted into flat-topped pulses by the limiting amplifier 55, and the full wave rectifier 56 translates the amplifier output into pulses all of positive polarity.

Figure 8:
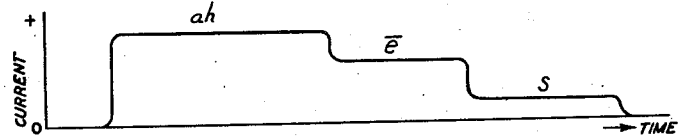
Fig. 8, 9 and 10 show graphs that will be referred to in describing the function of the pulse generator of Fig. 6 and the operation of the circuit arrangement of Fig. 7.
Figure 9:
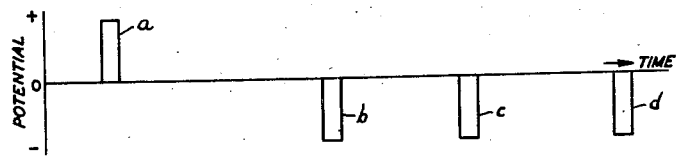
Figure 10:
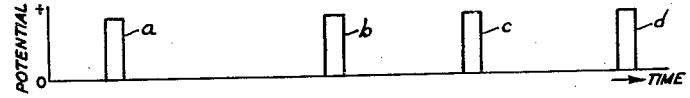

If it is assumed, by way of example, that the word "ice" is the initial word of a sequence of words spoken into the microphone, and the resultant audio frequency currents are amplified and impressed on the input of the pulse generator, the current through the resistance 53 and inductance 54 as a function of time may be represented by the chart of Fig. 8. Fig. 9 illustrates the positive and negative pulses delivered by the limiting amplifier, corresponding to the abrupt rise and abrupt decreases in the current representative of the phonetic units "ah", "ē", "s" constituting the speech sounds for "ice," and Fig. 10 illustrates the corresponding positive pulses present at the output terminals of the pulse generator, available for application to the bank of visual indicator units in the arrangement of Fig. 7.

The visual patterns corresponding to the speech sounds or phonetic units contained in the word "ice" would be displayed on the viewing areas of the arrangement of Fig. 7 in the following manner. Since the device 21 of unit A would have been rendered conducting and the device 21 of unit B would have been primed or conditioned to be rendered conducting, by prior adjustment of switch 37 to its off-normal position and return to the position shown in Fig. 7, when the word "ice" is spoken into the microphone M, the speech currents output of the amplifier AMP is applied to all of the amplifiers 22. Since the device 21 of unit A has already been triggered-on, a complex visual pattern, representative of the word "ice," will be displayed on the screen of that unit's cathode ray tube. At the same time, the initial positive pulse $a$ (Fig. 10) from the pulse generator will trigger on the device 21 of unit B, thereby priming unit C for operation on the next succeeding positive pulse, the visual pattern corresponding to the speech sound ah will be displayed on the screen of the cathode ray tube of unit B, and the device 21 of unit A will be triggered-off, as already explained above, as a result of the control grid thereof drawing current. The positive pulse $b$ (Fig. 10) occurring at the transition from the speech sound ah to the speech sound ē, thereafter triggers-on the visual indicator unit C whereby the visual pattern for the latter speech sound is displayed on the screen of the cathode ray tube of unit C, the next succeeding visual indicator unit (not shown) is conditioned for operation by the next succeeding positive pulse $c$ (Fig. 10), and the visual indicator unit B is triggered-off. In similar fashion, the succeeding positive pulses from the pulse generator trigger-off the active visual indicator unit, trigger-on the unit that has been primed or conditioned for operation on a next succeeding pulse, and prime the still next succeeding unit. As additional speech sounds are directed into the microphone M, successive speech sound patterns will be displayed on the viewing areas of the successive visual indicator units. After the unit N has been operated, unit A will again be available for visual pattern display inasmuch as the arrangement of Fig. 7 will include an appropriate number of visual indicator units and of cathode ray tubes having fluorescent screens of appropriate order of persistence, whereby the initial visual pattern on the initial viewing area, i. e., of unit A, will have disappeared or have decayed sufficiently to permit unit A again to be used for the display of a visual pattern, and so around the ring circuit.

Obviously, the visual indicator units of Fig. 7 may be included in a compact unitary assembly with the viewing areas of the cathode ray tubes arranged in a row in adjacent proximity. It will be understood, of course, that instead of a plurality of cathode ray tubes and a corresponding number of separate viewing areas, a single cathode ray tube structure could be provided which would include a single viewing area in the form of an elongated fluorescent screen and a plurality of adjacent electron gun and deflecting plate structures individual to the visual indicator units. The successive visual patterns in such a case would be displayed in successive adjacent regions of the screen.

What is claimed is:

1. The combination for presenting a speech sound in a form for interpretation visually that comprises means for translating the speech sound into a complex electric wave corresponding thereto, means for dividing such complex wave into component frequency bands, an oscilloscope, and means for applying the component bands concurrently to the oscilloscope to form a visual pattern.

2. The combination for presenting a speech sound in a form for interpretation visually that comprises means for translating the speech sound into a complex electric wave corresponding thereto, means for dividing said complex wave into component bands respective to lower and higher resonance regions for the particular speech sound, an oscilloscope, and means for applying the component bands concurrently to the oscilloscope to form a visual pattern.

3. In combination, means for converting the sound wave energy of a speech sound into an audio frequency electric wave corresponding in frequency-amplitude characteristic to said speech sound; frequency selective means for dividing the frequency content of said electric wave into two bands; an oscilloscope including an electron beam source, a luminescent screen against which the electron beam is directed, first means for deflecting said beam in one direction from a normal position upon application of electric wave energy to said first means, and second means for deflecting said beam from said normal position in a second direction at right angles to said first-mentioned direction upon application of electric wave energy to said second means; and means for applying each of said frequency bands concurrently to said deflecting means.

4. A combination for visually representing a speech sound by a visual pattern respective to the speech sound that comprises a source of complex electric wave of frequency content corresponding to the speech sound; frequency selective means for dividing said complex wave into two subwaves each embracing a different band of frequencies included in the complex wave; an oscilloscope including an electron beam source, a fluorescent screen against which the beam is directed, and a pair of deflector means for deflecting said beam into two different directions at right angles to each other upon application of electric wave energy to said deflector means; and means for applying said subwaves concurrently to said deflector means to deflect said electron beam in accordance with the combined effect of said subwaves to produce a visual pattern on the screen.

5. A combination for producing a visual representation respective to a specific sound wave characterized by a pair of resonances, each resonance embracing a different band of frequencies, comprising an oscilloscope having an electron beam source, a fluorescent screen against which said beam is directed, and electric wave energy receiving means for deflecting the electron beam in accordance with received wave energy in a plurality of different directions to cause the beam to execute a trace on said screen that is a resultant of deflections of the beam in said different directions; means for converting the speech sound into a complex electric wave having the resonance regions characteristic of the speech sound; means for separating the electric wave into two subwaves each including the frequencies of one of said resonance regions; and means for impressing said subwaves on the wave energy receiving means of said oscilloscope.

6. A combination for producing a visual pattern respective to a specific speech sound characterized by a pair of resonances, each resonance embracing a different band of frequencies, comprising an oscilloscope having an electron beam source, a fluorescent screen against which said beam is directed, a pair of spaced plates for deflecting the electron beam in one direction from its normal position, and a second pair of spaced plates for deflecting the electron beam in a second direction at right angles to said one direction when electric wave energy is applied to said plates; means for converting the speech sound into a complex electric wave having the resonance regions characteristic of said speech sound; means for dividing said complex wave into two subwaves each including the frequencies of one of said resonance regions; and means for applying said subwaves to said deflecting plates.

7. In combination, means for translating the sound wave energy of a speech sound into a complex electric wave of frequency content corresponding to that of a speech sound; means for generating control pulses respective to said complex wave; amplifying means conditioned for amplification of said complex wave by a control pulse from said second-mentioned means; an output circuit for said amplifying means including frequency selective means for dividing the amplified electric wave into two subwaves of different bands of the frequencies of said complex wave; an oscilloscope including an electric beam source, a fluorescent screen against which the electron beam is directed, and deflector means for deflecting the beam in response to electric wave energy supplied to said deflector means; and means for concurrently applying said subwaves to said sets of deflector means.

8. In combination, means for translating the sound wave energy of a sequence of speech sounds into a complex electric wave of sequential frequency content corresponding to that of the speech sounds; means for generating from said complex wave a source of control pulses respective to the individual speech sounds included in said sequence; a plurality of amplifying means conditioned successively by successive control pulses from said pulse generating means for amplification of successive portions of said complex wave respective to said successive control pulses; an output circuit for each amplifying means including frequency selective means for dividing the respective portion of the electric wave amplified into two subwaves of different bands of the frequencies of said portion of the electric wave; an oscilloscope individual to the output circuit of each amplifying means and including an electron beam source, a fluorescent screen against which the beam is directed, and deflector means for deflecting the beam in response to electric wave energy supplied to said deflector means, said oscilloscopes being positioned with their screens in adjacent proximity; and means individual to each oscilloscope for applying the two subwaves from the output circuit of the amplifying means respective to the oscilloscope to the latter's deflector means, whereby the resultant visual patterns corresponding to the successive speech sounds are produced in the sequence of the successive speech sounds on the adjacent screens of the oscilloscopes.

9. In combination, means for converting speech sound energy into a complex electric wave, frequency selective means for dividing the frequency content of said wave into one band of frequencies in the region below approximately 1100 cycles per second and into another band of frequencies in the region above approximately 1100 cycles per second, an oscilloscope including an electron beam source and means for deflecting the electron beam in different directions, and means for applying both of said bands of frequencies concurrently to said deflecting means.

10. A combination for visually presenting a speech sound in a form for interpretation by eye comprising a source of complex electric wave corresponding to said speech sound, means for dividing said wave into two subwaves, one subwave comprising the frequencies in the region below approximately 1100 cycles per second and the other subwave comprising the frequencies in the region above approximately 1100 cycles per second, an oscilloscope including an electron beam source and means for deflecting the electron beam in different directions, and means for applying said subwaves concurrently to said deflecting means.

11. In combination, means for translating a speech bearing wave into a complex electric wave corresponding thereto, means for dividing said electric wave into a band of the higher frequencies and a band of the lower frequencies of the frequency range of said wave, means for resolving each of said band of frequencies into phase-displaced components, and means responsive to said phase-displaced components for visually representing the composition of said wave.

12. In combination, a course of complex electric wave corresponding to a speech sound, means for dividing the electric wave into subwaves, each corresponding in frequency content to a portion of the frequency range embraced by the electric wave, an oscilloscope including an electron beam source, a fluorescent screen against which the beam is directed and a plurality of electron beam controlling means, and means for dividing each subwave into components in phase quadrature and for concurrently applying respective components of each subwave to respective electron beam controlling means.

13. In combination, a source of complex electric wave corresponding to a speech sound, means for dividing the electric wave into subwaves, each corresponding in frequency content to a portion of the frequency range covered by the electric wave, an oscilloscope including an electron beam source and two sets of electron beam controlling means, and means for dividing each subwave into a pair of phase-displaced components and for concurrently applying one component of each subwave to one set of beam controlling means and the other component of each subwave to the other set of beam controlling means.

14. The combination of claim 13 in which the wave dividing means separates the electric wave into two subwaves, one of which includes the frequencies below approximately 1100 cycles per second and the other of which includes the frequencies above approximately 1100 cycles per second.

15. In combination, means for translating a speech sound into a complex electric wave, frequency selective means for dividing the frequency range of said wave into a first band of frequency components and a band of higher frequency components, an oscilloscope comprising an electron beam source, a fluorescent screen against which the beam is directed, and a plurality of electron beam controlling means for moving the beam in response to electric wave energy supplied to the controlling means, and means for applying each band of frequencies concurrently in phase quadrature to respective beam controlling means.

16. In combination, a source of complex electric wave corresponding to a speech sound, means for dividing said wave into subwaves, each corresponding in frequency content to a portion of the frequency range covered by the electric wave, means for dividing each subwave into a plurality of phase-displaced components, and means responsive to the concurrent application thereto of said phase-displaced components for displaying visually a characteristic representation of the speech sound.

17. The method of translating a speech bearing wave into a visual representation thereof that comprises converting the speech bearing wave into a complex electric wave corresponding thereto, dividing the electric wave into a band of the lower frequencies and a band of the higher frequencies contained in the electric wave, resolving each of said bands into phase-displaced components, and generating a visual pattern characteristic of said components.

ROBERT R. RIESZ.

REFERENCES CITED

The following references are of record in the file of this patent:

UNITED STATES PATENTS

| Number | Name | Date |
| --- | --- | --- |
| 1,654,068 | Blattner | Dec. 27, 1927 |
| 1,794,393 | Brown et al. | Mar. 3, 1931 |
| 1,994,232 | Schuck | Mar. 12, 1935 |
| 2,051,153 | Rieber | Aug. 18, 1936 |
| 2,084,760 | Beverage | June 22, 1937 |
| 2,088,297 | Koenig | July 27, 1937 |
| 2,137,888 | Fuller | Nov. 22, 1938 |
| 2,231,971 | Tubbs | Feb. 18, 1941 |
| 2,403,983 | Koenig | July 16, 1946 |
| 2,403,986 | Lacy | July 16, 1946 |
| 2,416,353 | Shipman | Feb. 25, 1947 |
| 2,425,003 | Potter | Aug. 5, 1947 |